Nov. 15, 1927. 1,649,090
C. WILLHOEFT
REGULATING APPARATUS FOR CENTRAL HEATING APPLIANCES
Filed May 27, 1926
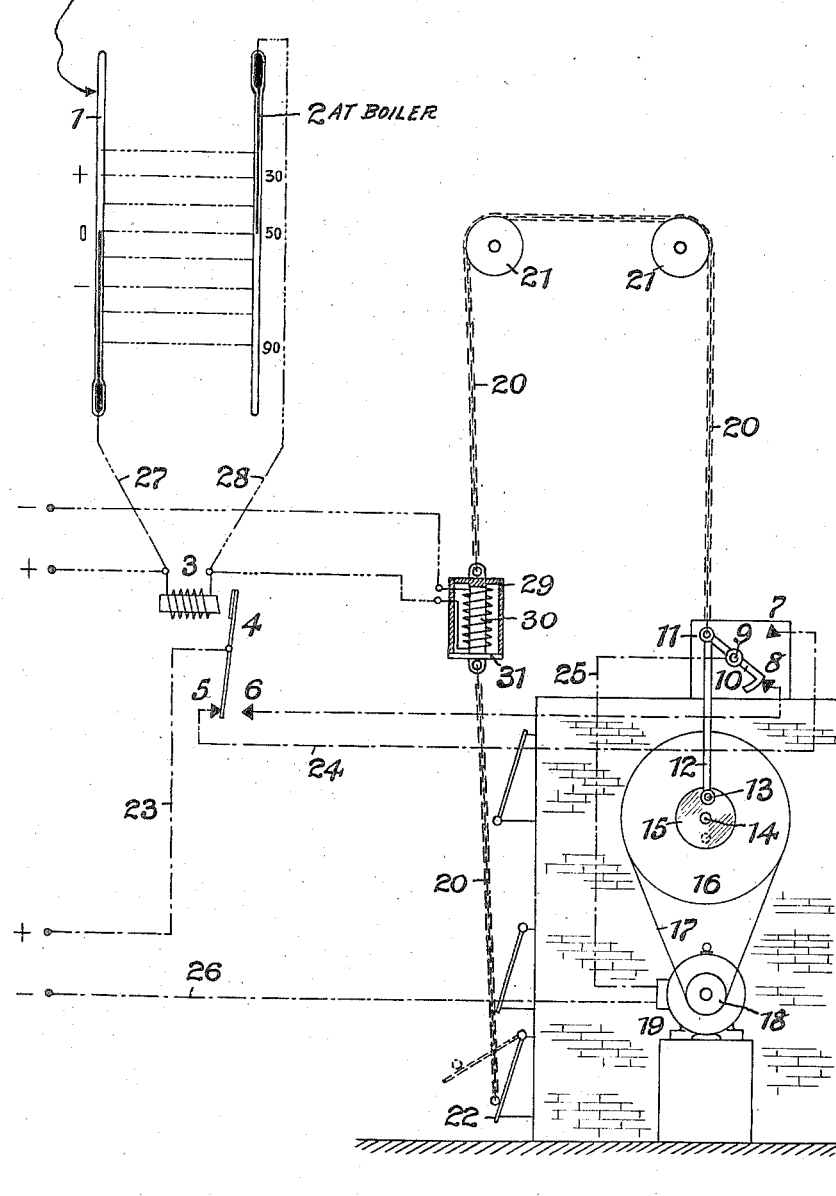

Patented Nov. 15, 1927.

1,649,090

UNITED STATES PATENT OFFICE.

CARL WILLHOEFT, OF WANDSBEK, GERMANY.

REGULATING APPARATUS FOR CENTRAL HEATING APPLIANCES.

Application filed May 27, 1926, Serial No. 112,158, and in Germany November 9, 1925.

This invention relates to regulating devices for central heating apparatus of the kind in which a damper or valve controlling the condition of the heating apparatus is controlled by means of an instrument indicating the condition of the apparatus or the temperature of the apartment to be heated, or the external temperature. Heretofore it has been proposed to open or close a valve operating auxiliary heaters through the action of an instrument affected by outside temperature, and to use in conjunction with this arrangement instruments affected by the temperature in individual apartments to shut off or open the supply valve of the particular auxiliary heater serving that apartment.

It has also been proposed to utilize, for opening and closing a damper or fuel supply valve, the pressure generated in a thermostat system comprising two or more thermostats respectively subjected to the external temperature and the temperature of the heating medium.

According to the present invention, however, two instruments are provided which respectively indicate the outside temperature and the condition of the heating apparatus and which have electrical contacts brought into connection at predetermined indications of the two instruments so as to energize a relay for starting a motor, making the latter dependent upon the relationship between the outside and inside conditions, a switch operated by the motor effecting the stopping of the motor after a predetermined period.

The invention also includes the provision of a two-part operative connection between the motor and damper or valve, said parts being connected together by an electromagnetic coupling adapted to break on failure of current in the relay circuit.

The accompanying drawing is a diagrammatic illustration of a constructional form of the invention given by way of example.

The invention is based upon the idea of exposing the regulator, in the case of hot water appliances to be regulated according to the outside temperature and the temperature of the water, to the influence of two so-called contact thermometers 1, 2. One of these thermometers, say 1, is mounted in the open, i. e. on an external wall for indicating the outside temperature, while the other, 2, is affixed to the boiler for indicating the temperature of the water.

In an electrical circuit connecting the two thermometers 1, 2, with each other, a relay is inserted, which consists of an electromagnet 3, and an armature 4 co-operating with two contacts, 5, 6 in a motor circuit. The contacts 5, 6, are in the same circuit as contacts 7, 8, with one or other of which a switch lever 10, pivoted at 9, is adapted to make contact.

One arm of the switch lever 10 is pivotally connected at 11 to a connecting rod 12 which in turn is attached to a crank pin 13 on a disc 15 rotatable about the axis 14. The disc 15 is driven by the electric motor 19 through suitable gearing which, in the constructional form shown in the drawing, comprises a groove- or chain-wheel 16, an endless cord or chain 17 and a groove- or chain-wheel 18.

The rod 12 is also connected at 11, with a chain or cable 20 which passes over conveniently located rollers 21 and is attached to the air damper 22 of the furnace.

The contacts preferably of the plug-in type of the two mercury thermometers 1, 2, are so arranged that a predetermined contact of the outside thermometer 1, for example the contact 0° C., is connected with the contact of the water thermometer 2 at 50°, it being herein assumed that these contact connections of the two thermometers correspond to a room temperature of 20°. The coil of the relay electro-magnet 3 in this contact connection is short circuited, the motor 19 of the regulator being connected up along the lead 23, the relay armature 4, the contact 5, the lead 24, the contact 7, the switch lever 10, the lead 25 and the lead 26, the crank 13 being thus turned 180° and reaching the position indicated in full lines in the drawing. In this position the connection between the switch lever 10 and the contact 7 is broken, whilst the connection between the switch lever 10 and the contact 8 is established and the air damper 22 is closed.

If the temperature of the water or the outside temperature should fall, the short circuit of the coil of the electro-magnet 3 over the leads 27, 28, breaks, the relay connects up the motor 19; the latter by driving the crank 13 actuates the connecting rod 12, the chain 20 being thereby pulled to elevate the air dampter 22 so as to draw up the fire until the proper water temperature is reached to correspond with the outside temperature. As soon as this is effected the coil of the electro-magnet 3 will again be short circuited by the contact thermometers 1, 2, the relay being thus actuated to connect up the motor 19 which again closes the air damper 22 of the furnace.

The hereinbefore described procedure repeatedly takes place in one way or another and the water temperature of the central heating appliance follows closely the variations of the outside temperature so that the room temperature will remain constant.

The chain or cable 20 connecting the air damper 22 of the furnace with the rod 12 is in two parts which are held together by an electro-magnet with its coil 30 located in a casing 29, and an armature 31. If for any reason the current should fail the electro-magnet will release the armature 31, the connection between the two extremities of the chain 20 will be broken, and the air damper 22 will close by its own weight, if it be open, or remain closed, thus preventing an excessive temperature.

In the case of steam heating installations the regulator is controlled according to the outside temperature and the steam pressure, so-called contact thermometers and contact steam pressure gauges being employed for the purpose. Either mercurial columns, or spring actuated pressure gauges, provided with contacts may be used as contact pressure gauges.

The consumption of current of the arrangement is so small that the small expense incurred under this head will be more than compensated by the great saving in fuel.

For larger installations having a number of boilers, a single regulator of the type described will be found sufficient.

The regulator can also be employed with central heating installations which are operated from generating plants located some distance away. In this case the steam inlet valve constitutes an equivalent for the air damper 22.

It is especially pointed out in reference to the constructional example given in the drawings that alterations in the construction or in the measurements of the respective parts described may be made without going beyond the scope of the invention.

What I do claim as my invention and desire to secure by Letters Patent is:—

1. In regulating means for central heating apparatus, the combination of two instruments indicating respectively the outside temperature and the condition of the heating apparatus, contacts in the respective instruments electrically connected at predetermined indications of the respective instruments, a regulating device for the heating apparatus, a motor adapted to control said device, and a relay actuated by the making and breaking of said contacts to switch on the motor.

2. In regulating means for central heating apparatus, the combination of two instruments indicating respectively the outside temperature and the condition of the heating apparatus, contacts on the respective instruments electrically connected at predetermined indications of the respective instruments, a regulating device for the heating apparatus, a motor adapted to control said device, a relay actuated by the making and breaking of said contacts to switch on the motor and means adapted to switch off the motor at the end of a predetermined period.

3. In regulating means for central heating apparatus, the combination of two instruments indicating respectively the outside temperature and the condition of the heating apparatus, contacts on the respective instruments electrically connected at predetermined indications of the respective instruments, a regulating device for the heating apparatus, a motor, a two-part member through which the motor controls the regulating device, a relay actuated by the making and breaking of said contacts to switch on the motor, and an electro-magnetic coupling between the two parts of said member adapted to break on failure of current in the relay circuit.

4. In regulating means for central heating apparatus, the combination of a thermometer adapted to indicate the outside temperature, a thermometer adapted to indicate the temperature of the heating apparatus, contacts on the two thermometers electrically connected at predetermined indications of the respective thermometers, an air damper for the furnace of the heating apparatus, a motor adapted to control the position of said damper, and a relay actuated by the making and breaking of the thermometer contacts to switch on the motor.

5. In regulating means for central heating apparatus, the combination of a thermometer adapted to indicate the outside temperature, a thermometer adapted to indicate the temperature of the heating apparatus, contacts on the two thermometers electrically connected at predetermined indications of the respective thermometers, an air damper for the furnace of the heating apparatus, a motor, a crank operated by said motor, a chain connecting said crank with the damper and adapted to open and close the damper on rotation of the crank, a relay actuated by the making and breaking of the thermometer contacts to switch on the motor, and a switch operated by the crank to switch off the motor after the crank has turned through 180° of its rotation.

6. In regulating means for central heating apparatus, the combination of a thermometer adapted to indicate the outside temperature, a thermometer adapted to indicate the temperature of the heating apparatus, contacts on the two thermometers electrically connected at predetermined indications of the respective thermometers, an air damper for the furnace of the heating apparatus, a motor, a crank operated by said motor, a two-part chain connecting said crank with the damper and adapted to open and close the damper on rotation of the crank, a relay actuated by the making and breaking of the thermometer contacts to switch on the motor, a switch operated by the crank to switch off the motor after the crank has turned through 180° of its rotation, and an electro-magnetic coupling between the two parts of the chain adapted to break on failure of the current in the relay circuit.

In witness whereof I have hereunto signed my name this 7th day of May 1926.

CARL WILLHOEFT.